(No Model.)

W. H. BUTLER.
BOLT NUT.

No. 602,724.    Patented Apr. 19, 1898.

Witnesses
Lee J. Van Horn
Victor J. Evans

Inventor
W. H. Butler.
By John Wedderburn
Attorney

UNITED STATES PATENT OFFICE.

WINFIELD H. BUTLER, OF LANDENBURG, PENNSYLVANIA.

BOLT-NUT.

SPECIFICATION forming part of Letters Patent No. 602,724, dated April 19, 1898.

Application filed April 26, 1897. Serial No. 633,953. (No model.)

*To all whom it may concern:*

Be it known that I, WINFIELD H. BUTLER, a citizen of the United States, residing at Landenburg, in the county of Chester and State of Pennsylvania, have invented certain new and useful Improvements in Bolt-Nuts; and I do hereby declare the following to be a full, clear, and exact description of the invention, such as will enable others skilled in the art to which it appertains to make and use the same.

My invention relates to bolt-nuts, the object of the same being to provide a threadless nut having means whereby it may be secured in place upon a bolt and in which slipping thereof is effectually prevented.

The invention consists of a nut having a recess in the side thereof intersecting the central aperture through the nut and a removable spring-actuated locking-piece fitting within said recess and adapted to engage the outer surface of the bolt on which said nut is placed.

More specifically the invention consists of a nut having a pair of parallel lugs upon one side thereof, a recess between said lugs intersecting the central opening through said nut, a pin engaged by the hooked ends of said lugs, a lever pivoted to said pin fitting within said recess and adapted to engage the outer surface of the bolt on which said nut is placed, and a spring for normally urging said lever inwardly.

The invention also consists in other details of construction and combination of parts, which will be hereinafter fully described and claimed.

Figure 1:
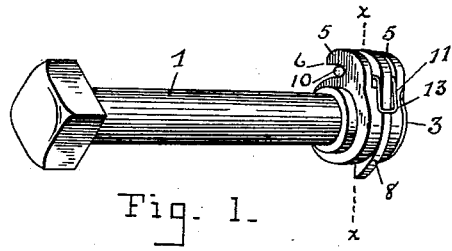
Figure 2:
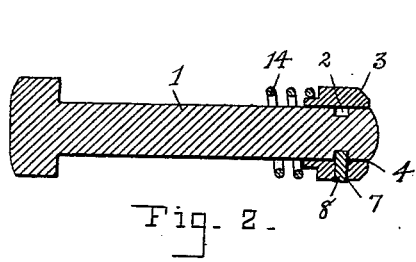
Figure 3:
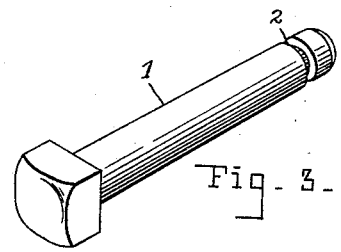
Figure 4:
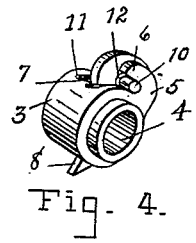
Figure 5:
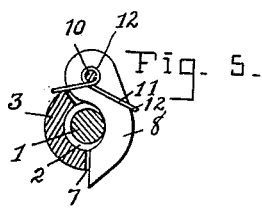
Figure 6:
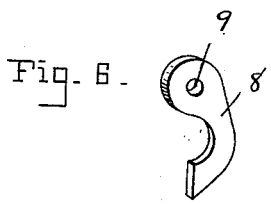
Figure 7:
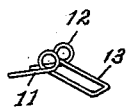

In the drawings forming a part of this specification, Figure 1 represents a perspective view of my improved nut shown applied to the end of a bolt. Fig. 2 is a longitudinal section through the same. Fig. 3 is a detail perspective view of the bolt employed. Fig. 4 is a similar view of the nut. Fig. 5 is a cross-section on the line $x\ x$ of Fig. 1. Fig. 6 is a detail perspective view of the locking-lever, and Fig. 7 is a similar view of the spring for actuating said lever.

Like reference-numerals indicate like parts in the different views.

The bolt 1 is formed without threads in the shank thereof, but has an annular groove 2 at a point near its outer end. The nut 3 is adapted to fit upon the bolt 1 and has a central aperture 4, which is also formed without threads. The said nut also has formed upon one side thereof a pair of parallel lugs or projections 5 5, which are formed with hooked ends 6, as clearly shown. Between the lugs 5 5 and extending around to a point opposite thereto is a recess 7, which extends through one side of the nut and intersects the opening 4 therein. Adapted to fit within the recess 7 is a locking-lever 8, which is formed with an opening 9 at its rear end, through which passes a lateral projection or pin 10, which when in place is engaged by the under side of the hooks 6 on the lugs 5 5. By the provision of the lateral projection or pin 10 upon the locking-lever 8 and the hooked end 6 on the lugs or projections 5 the said locking-lever may be readily applied or removed by simply passing said lever into the recess 7, with the pin 10 fitting beneath the lug 6, or reversing this operation. The said locking-lever projects through the recess 7 into the central opening 4 of the nut and is adapted to fit within the annular groove 2 on the bolt 1. The free end of said lever is normally urged inwardly by means of a spring 11, which has two coils 12 12 formed within it, through which the pin 10 passes, and has a forwardly-extending bent two-part arm 13, which bears against the outer edge of said lever.

In connection with the foregoing parts I also employ a coil-spring 14, which engages the side edge of the nut 3 and the side of the material through which the bolt 1 passes, said spring being provided for the purpose of preventing rattling and for holding the head of the bolt 1 in close engagement with the opposite side of the material through which it passes.

My improved nut is especially adapted to be used upon bolts employed for holding the shafts or poles of vehicles in place, although it may be used upon a bolt in any connection where it is not important that the same be tightly clamped in place. To apply the nut to the bolt, it is merely necessary to withdraw the locking-lever 8 from the recess 7, which action permits the free passage of the bolt 1 through the central aperture 4. As soon as the groove 2 comes opposite the under side of the locking-lever 8 said lever falls by spring-pressure into said groove and locks the nut in place on said bolt.

Having thus described the invention, what is claimed as new, and desired to be secured by Letters Patent, is—

1. A nut having a recess intersecting the central aperture therein, hooked projections thereon, a locking-dog fitting within said recess and having lateral projections adapted to fit beneath said hooked projections, whereby said dog may be readily applied and removed, and a spring for normally urging said dog inwardly.

2. A nut having a smooth central opening, and a recess in one side thereof intersecting said central opening, a pair of lugs having hooked ends, one on each side of said recess, a pin engaged by the hooked ends of said lugs, a locking-lever fulcrumed to said pin and fitting within said recess, and a spring for normally urging the free end of said locking-dog inwardly.

3. A nut having a smooth central opening, and a recess in one side thereof intersecting said central opening, a pair of lugs having hooked ends, one on each side of said recess, a pin engaged by the hooked ends of said lugs, a locking-lever fulcrumed to said pin and fitting within said recess, and a spring for normally urging the free end of said locking-dog inwardly, constructed of a single piece of wire having two coils formed therein through which said pin passes, and a two-part arm leading from said coils and engaging the outer edge of said dog, substantially as and for the purpose described.

4. The combination with a bolt having a smooth shank with an annular groove therein, of a nut having a central smooth opening, a recess in one side thereof intersecting said central opening, a pair of parallel lugs having hooked ends located one on each side of said recess, a removable pin engaged by said hooked end, a locking-lever fulcrumed to said pin fitting within said recess and adapted to engage the annular groove in said bolt, a spring for normally urging the free end of said locking-lever inwardly, the said spring being formed with two coils through which said pin passes, and a two-part arm leading outwardly from said coils and engaging the outer edge of said lever, and a coil-spring engaging the side edge of said nut for holding the head of said bolt in close contact with the material through which it passes and thereby preventing rattling, substantially as described.

In testimony whereof I have signed this specification in the presence of two subscribing witnesses.

WINFIELD H. BUTLER.

Witnesses:
C. Y. WILSON,
SAML. JAGGER.